No. 820,126. PATENTED MAY 8, 1906.
H. W. PHILLIPS.
GUIDE FOR JOINING PIPE SECTIONS.
APPLICATION FILED SEPT. 22, 1905.
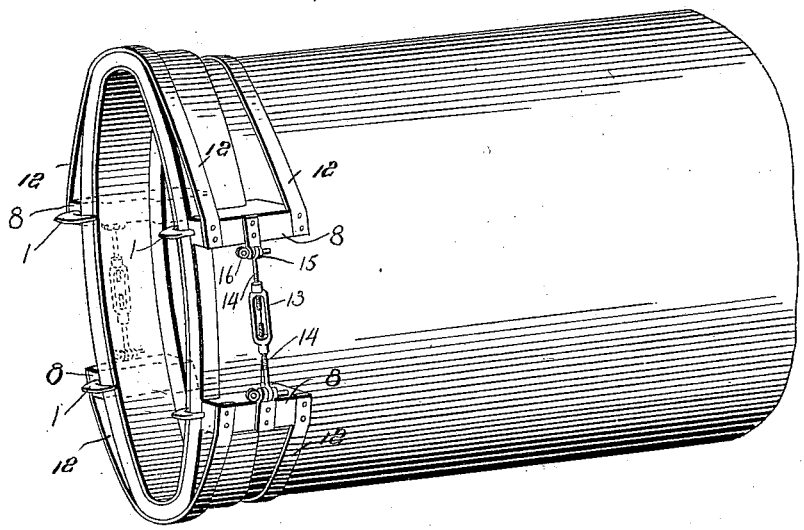
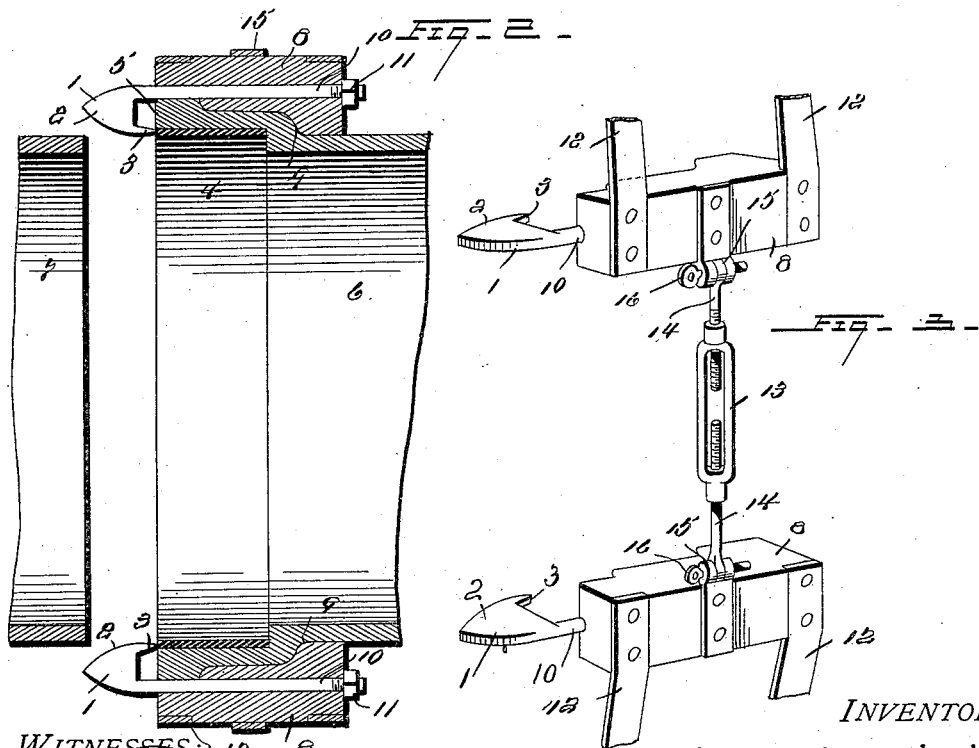
WITNESSES
INVENTOR
Hiram W. Phillips,
By E. B. Stocking,
Attorney

UNITED STATES PATENT OFFICE.

HIRAM W. PHILLIPS, OF QUINCY, MASSACHUSETTS.

GUIDE FOR JOINING PIPE-SECTIONS.

No. 820,126.   Specification of Letters Patent.   Patented May 8, 1906.

Application filed September 22, 1905. Serial No. 279,704.

*To all whom it may concern:*

Be it known that I, HIRAM W. PHILLIPS, a citizen of the United States, residing at Quincy, in the county of Norfolk, State of Massachusetts, have invented certain new and useful Improvements in Guides for Joining Pipe-Sections, of which the following is a specification, reference being had therein to the accompanying drawings.

This invention relates to a guide for joining pipe-sections, and particularly to a removable device adapted for application to the bell or flange end of a pipe.

The invention has for an object to provide means by which pipe-sections may be readily assembled or inserted in each other in submarine work, as in that class of work it is customary to assemble the sections on shore and there apply the lead or other packing used, when the sections are subsequently separated, leaving the packing within the bell of one section. This produces a very close and accurate fit between the sections, and much time has heretofore been required in guiding the heavy pipe-sections into such accurate alinement as to permit their assemblage without injury to the packing already in position. For the purpose of accomplishing this assemblage the guides hereinafter shown and described are provided for application to the bell end of one section and have their hooked ends disposed in the plane of the inner face of the packing, so as to provide inclined guides or ways by which the inserted section may be brought into accurate alinement with the packing without injury thereto, and after its insertion the packing is expanded in the usual manner to effect a tight joint between the pipe-sections.

Other and further objects of the invention will be hereinafter set forth and the novel features thereof defined by the appended claims.

In the drawings, Figure 1 is a perspective showing the application of the invention to a pipe. Fig. 2 is a vertical cross-section on an enlarged scale, and Fig. 3 is a detail perspective of the couplings for the holding-bands.

Like numerals of reference refer to like parts throughout the several views of the drawings.

The numeral 1 designates a guide, which is provided with an inclined face 2 and a hooked portion 3, adapted to lie in contact and alinement with the packing 4, inserted within the bell portion 5 of the pipe-section 6, which is adapted to be assembled with a coöperating section 7 by insertion of the latter within the bell and packing. Any desired means may be used for supporting the guides in position; but as it is essential that they be held firmly to resist any lateral strain thereon by a blow from the companion pipe-section I have herein shown and described a form of such mounting comprising a block 8, having its inner face 9 shaped to conform to the bell of the pipe. From the guide a shank 10 extends through the block, and the guide is secured therein by means of a nut 11 at the inner threaded end of the shank and adjusted into contact with the packing by nut 11.

The blocks and the guides carried thereby are secured upon the pipe-section by means of a band 12, extending between the blocks, any desired number of such bands being used and secured to the blocks. These parts are secured and held in position by means of the turnbuckle 13, extending between the adjacent blocks and having the threaded eyes 14, at the opposite ends thereof, adapted for insertion between the coupling-eyes 15, secured to the blocks and held by means of the removable coupling-pin 16, which can be readily withdrawn when it is desired to remove the bands from the pipe after the latter is properly inserted in position, and thus obviate the necessity of an extended operation of the turnbuckle for such removal.

In the operation of this invention it will be seen that the guides may be simply and quickly applied to the pipe by means of the holding-bands and their couplings, while these parts are tightened and adjusted in position by means of the turnbuckle connections between the same. The guides when in the position shown in Fig. 2 provide an inclined surface for a distance at each side of the packing, so that when the companion pipe-section is moved in contact with these guides it is forced into accurate alinement to effect a close fit within the packing, thus providing means by which the pipe-sections may be quickly, accurately, and readily assembled in submarine work, and the delays incident to bringing said sections into accurate alinement and injury to the packing already in position is entirely avoided. The mounting of the guide in the blocks permits its adjustment by the nut threaded thereon into firm contact with the edge of the packing.

While I have described my invention as applied to the work of joining sections of pipe together in submarine constructions, it is to be understood that the said invention is applicable either as shown and described or by the exercise of mere mechanical skill to the joining of tubes, tunnel-lining sections, and all other structures comprising tubular members or sections which require assembling to constitute a completed structure, and in all cases the number and location of the guides, as well as the means for removably securing them in place, may be varied to suit each particular condition of use.

Having now described my invention and set forth its merits, what I claim, and desire to cover by Letters Patent, is—

1. A guide for joining pipe-sections having an inclined face extending inwardly into alinement with the inner face of the opening at one end of said pipe, and means for rigidly supporting said guide upon a pipe.

2. A guide for pipe-sections having an inclined face disposed in alinement and contact with one wall of said pipe, means for rigidly supporting said guide upon a pipe, and means for adjusting said guide longitudinally upon its supporting means.

3. A guide for joining pipe-sections comprising a hooked member having an inclined face and engaging point, a shank extending from said face and provided with adjusting means, and means for supporting said guide upon a pipe.

4. A guide for joining pipe-sections comprising a hooked member having an inclined face, a shank extending from said face, a block for supporting said shank, means for drawing said hooked member into engagement with the end of a pipe, and a band disposed upon a pipe for supporting said block.

5. A guide for joining pipe-sections comprising a hooked member having an inclined face, a shank extending from said face, a block for supporting said shank, a band disposed upon a pipe for supporting said block, and an adjustable connection between the free ends of said band for clamping the same in position.

6. A guide for joining pipe-sections comprising a hooked member having an inclined face, a shank extending from said face, a block for supporting said shank, a band disposed upon a pipe for supporting said block, a turnbuckle disposed at the free ends of said band, and a removable coupling-pin for connecting said buckle to said band.

7. In a guide for joining pipe-sections, a hooked member having an inclined face at one side thereof, a shank extending inward from said member, a block in which said shank is mounted, and means carried by the inner end of said shank for adjusting said shank in said block to bring said member into contact with a pipe-section.

8. The combination with a pipe-section having a packing disposed within the bell portion thereof, of a plurality of guides in engagement with the packing and having inclined faces disposed in alinement with the inner face of said packing to guide therein a companion section.

In testimony whereof I affix my signature in presence of two witnesses.

HIRAM W. PHILLIPS.

Witnesses:
ALFRED T. GAGE,
APPLETON P. CLARK.